3,639,383
COMPLEXES OF A.C.T.H. PEPTIDES AND POLYPHOSPHORIC ACIDS

Leo Geller, Basel, Switzerland, assignor to Ciba Corporation, New York, N.Y.
No Drawing. Filed Jan. 23, 1968, Ser. No. 699,777
Claims priority, application Switzerland, Feb. 9, 1967, 1,954/67; May 3, 1967, 6,439/67; Dec. 12, 1967, 17,435/67
Int. Cl. A61k *17/16;* C07c *103/52*
U.S. Cl. 260—112.5                                    15 Claims

ABSTRACT OF THE DISCLOSURE

Complexes having a prolonged adrenocorticotropic activity, consisting of adrenocorticotropically active peptides and polyphosphoric acids containing on an average at least 7 phosphorus atoms, or their salts.

---

A problem that has not yet been resolved satisfactorily, involved in the therapeutic use of adrenocorticotropically active peptides, for example of corticotropin, is that the peptides lose their activity in the body too quickly. Various attempts have been made to prolong their active life, for example by forming complexes of the peptides with inorganic substances, such as sparingly soluble zinc compounds, for example, zinc hydroxide or zinc phosphate, or with organic substances such as gelatin, polyvinylpyrrolidone, phosphoric acid esters of polyphenols or polyalcohols, for example polyphloretine phosphate, or alkaline or acidic polyamino acids, for example, protamine or polyglutamic acids. Apart from the fact that the activity prolongation thus achieved is still not quite satisfactory, some of the preparations thus manufactured have the disadvantage that they may cause allergies.

The present invention is based on the observation that a good prolongation of the adrenocorticotropic activity, combined with good tolerability, is achieved when compounds of adrenocorticotropically active peptides with polyphosphoric acids, containing on an average at least 7 phosphorus atoms, or their salts are manufactured.

The present invention thus provides a process for the manufacture of adrenocorticotropically active peptides with prolonged activity, characterized in that the peptides are reacted with polyphosphoric acids (condensation products of phosphoric acids) that contain on an average at least 7 phosphorus atoms, or their salts.

By this reaction a sparingly soluble compound of the peptide with the polyphosphoric acid or the polyphosphate having a prolonged activity, is formed.

Suitable salts of the polyphosphoric acids are water-soluble salts, for example, alkali metal salts, especially sodium and/or potassium salts. The polyphosphoric acids may take the form of linear or branched chains (cross-linked polyphosphates). Examples are the products of Messrs. J. A. Benckiser, Ludwigshafen, marketed under the trade name Calgon or Polyron, of the general formula $Na_{m+2}P_mO_{3m+1}$, where the average degree of condensation $m=7$ to 10,000, especially from 7 to 1000 or more specifically 20 to 500, such as Calgon N (linear polyphosphate, mean degree of condensation=7); Calgon 322 (linear polyphosphate, mean degree of condensation 15–30); Polyron H (linear polyphosphate, mean chain length about 28); Polyron B12 (highly condensed, linear polyphosphate, with long-chain constituents of over 1000); Calgon 188 (highly condensed potassium polyphosphate in admixture with sodium polyphosphate).

As adrenocorticotropically active peptides there may be mentioned, for example the natural corticotropins, such as β-corticotropin (and the corresponding synthetic peptides having the identical amino acid sequence) and also synthetic peptides having a shorter amino acid sequence, for instance a sequence of 16–38 amino acids from the N-terminal, and/or one in which some amino acids, especially those in one or more of positions 1–5, 17, 18 and 25–33, have been exchanged for other α-amino acids. It is known that it is possible to split off the amino acids up to about the sixteenth N-terminal amino acid from the carboxyl end of natural ACTH, without completely losing the ACTH activity. The N-terminal sequence has preferably at least 18 amino acids. The last amino acid (C-terminal) need not be in the form of a free carboxylic acid, but may be amidated or esterified. It is also possible to replace some amino acids by others. Thus, for example, the serine residues serine[1] and/or serine[3] may be replaced by glycine or alanine; tyrosine[2] by phenylalanine; methionine[4] by norvaline, leucine, norleucine or α-aminobutyric acid; glutamic acid[5] by glutamine; arginine[17,18] by ornithine or lysine. The amino acids in position 25 can be replaced by valine, and the first amino acid (serine[1]) may also be replaced by proline, threonine or other amino acids or it may be absent, or further amino acid residues may precede it. It is also possible for individual amino acids, particularly the first amino acid, to be in the D-form instead of the natural L-form, for example, the first amino acid may be D-alanine, D-threonine or D-proline. More especially, the first N-terminal amino acid is D-serine. As ACTH-active peptides of the present invention there are suitable, in addition to natural β-corticotropin, above all, peptides containing a chain of 18 to 28, preferably of 18 to 25, amino acids reckoned from the amino end of the β-corticotropin and which may, if desired, have a different amino acid sequence or a different configuration, especially D-configuration of the first amino acid, as well as amides of these peptides, especially the C-terminal unsubstituted amides.

The peptides are reacted with the polyphosphate in an aqueous solution at room temperature. Instead of the free peptide there may be used its acid addition salts. The pH value of the suspension should be between 5 and 7.8, preferably between about 6 and 7. The suspension may also contain additives, for example, agents for preserving or stabilizing the preparations.

The following examples illustrate the invention. In human therapy, the preparations mentioned therein are used at a dosage of 1 ml. s.c. or 1 i.m. one to seven times a week.

EXAMPLE 1

A solution of 1.0 mg. of $\beta^{1-24}$-corticotropin hexaacetate and 9.0 mg. of sodium chloride in 0.5 ml. of distilled water is mixed with a solution of 2 mg. of sodium polyphosphate Calgon N in 0.5 ml. of distilled water. The resulting suspension has the following composition:

|   | Mg. |
|---|---|
| $\beta^{1-24}$-corticotropin hexaacetate | 1.0 |
| Sodium polyphosphate (Calgon N) | 2.0 |
| Sodium chloride | 9.0 |
| Distilled water to make 1.0 ml. | |

The suspension has a pH value of 6.9; it is suitable for intramuscular injection.

EXAMPLE 2

A suspension of the following composition is prepared as described in Example 1:

|   | Mg. |
|---|---|
| $\beta^{1-24}$-corticotropin hexaacetate | 1.0 |
| Sodium polyphosphate (Calgon 322) | 2.0 |
| Sodium chloride | 9.0 |
| Distilled water to make 1.0 ml. | |

The suspension has a pH value of 5.9.

EXAMPLE 3

A suspension of the following composition is prepared as described in Example 1:

| | Mg. |
|---|---|
| $\beta^{1-24}$-corticotropin hexaacetate | 1.0 |
| Polyron $B_{12}$ | 1.0 |
| Sodium chloride | 9.0 |
| Distilled water to make 1.0 ml. | |

The suspension has a pH value of 5.9.

EXAMPLE 4

A suspension of the following composition is prepared as described in Example 1:

| | Mg. |
|---|---|
| $\beta^{1-24}$-corticotropin hexaacetate | 1.0 |
| Calgon 188 | 1.0 |
| Sodium chloride | 9.0 |
| Distilled water to make 1.0 ml. | |

EXAMPLE 5

A suspension of the following composition is prepared as described in Example 1:

| | Mg. |
|---|---|
| D-Ser$^1$-Lys$^{17,18}$-$\beta^{1-18}$-corticotropin-Lys$^{18}$-amide | 0.1 |
| Calgon N | 2.0 |
| NaCl | 2.0 |
| Benzyl alcohol | 10.0 |
| Distilled water to make 1.0 ml. | |

EXAMPLE 6

A suspension of the following composition is prepared as described in Example 1:

| | Mg. |
|---|---|
| D-Ser$^1$-$\beta$-$1-23$-corticotropin-Tyr$^{23}$-amide | 0.5 |
| Calgon 322 | 1.0 |
| NaCl | 2.0 |
| Benzyl alcohol | 10.0 |
| Distilled water to make 1.0 ml. | |

EXAMPLE 7

Suspensions are prepared as described in Examples 1 to 6 which contain one of the following peptides:

D-Ser$^1$-Orn$^{17,18}$-$\beta^{1-18}$-corticotropin-Orn$^{18}$-amide,
$\beta^{1-18}$-corticotropin-Arg$^{18}$-amide,
Lys$^{17-18}$-$\beta^{1-18}$-corticotropin-Lys$^{18}$-amide,
D-Ser$^1$-Phe$^2$-Lys$^{17,18}$-$\beta^{1-18}$-corticotropin-Lys$^{18}$-amide,
D-Ser$^1$-Gly$^3$-Lys$^{17,18}$-$\beta^{1-18}$-corticotropin-Lys$^{18}$-amide,
D-Ser$^1$-Nle$^4$-Lys$^{17,18}$-$\beta^{1-18}$-corticotropin-Lys$^{18}$-amide,
$\beta^{1-19}$-corticotropin-Pro$^{19}$-amide,
$\beta^{1-19}$-corticotropin,
D-Ser$^1$-$\beta^{1-19}$-corticotropin,
$\beta^{1-19}$-corticotropin-Pro$^{19}$-amide,
Glu(NH$_2$)$^5$-$\beta^{1-19}$-corticotropin,
$\beta^{1-20}$-corticotropin,
$\beta^{1-20}$-corticotropin-Val$^{20}$-amide,
α-amino-butyryl$^4$-Glu(NH$_2$)$^5$-$\beta^{1-20}$-corticotropin-Val$^{20}$-amide,
α-amino-butyryl$^4$-$\beta^{1-20}$-corticotropin-Val$^{20}$-amide,
$\beta^{1-21}$-corticotropin-Lys$^{21}$-amide,
$\beta^{1-21}$-corticotropin,
$\beta^{1-22}$-corticotropin,
$\beta^{1-22}$-corticotropin-Val$^{22}$-amide,
$\beta^{1-23}$-corticotropin,
$\beta^{1-23}$-corticotropin-Tyr$^{23}$-amide,
Phe$^2$-$\beta^{1-23}$-corticotropin-Tyr$^{23}$-amide,
Ala$^3$-$\beta^{1-23}$-corticotropin-Tyr$^{23}$-amide,
Gly$^1$-$\beta^{1-23}$-corticotropin-Tyr$^{23}$-amide,
$\beta^{2-23}$-corticotropin-Tyr$^{23}$-amide,
D-Ser$^1$-$\beta^{1-24}$-corticotropin Pro$^{24}$-amide,
D-Threo$^1$-$\beta^{1-24}$-corticotropin,
D-Ser$^1$-Orn$^{17,18}$-$\beta^{1-24}$-corticotropin-Pro$^{24}$-amide,
D-Ser$^1$-Nle$^4$-$\beta^{1-24}$-corticotropin,
D-Ser$^1$-Nle$^4$-$\beta^{1-24}$-corticotropin-Pro$^{24}$-amide,
D-Ser$^1$-Nle$^4$-Orn$^{17,18}$-$\beta^{1-24}$-corticotropin,
D-Ser$^1$-Nle$^4$-Orn$^{17,18}$-$\beta^{1-24}$-corticotropin-Pro$^{24}$-amide,
Nle$^4$-$\beta^{1-24}$-corticotropin,
Glu(NH$_2$)$^5$-$\beta^{1-24}$-corticotropin,
Gly$^{1,3}$-$\beta^{1-24}$-corticotropin,
Orn$^{17,18}$-$\beta^{1-24}$-corticotropin,
Lys$^{17,18}$-$\beta^{1-24}$-corticotropin,
D-Ser$^1$-$\beta^{1-24}$-corticotropin,
D-Ala$^1$-$\beta^{1-24}$-corticotropin,
D-Ser$^1$-Gly$^3$-Lys$^{17,18}$-$\beta^{1-24}$-corticotropin,
D-Ser$^1$-Gly$^3$-Lys$^{17,18}$-$\beta^{1-24}$-corticotropin-Pro$^{24}$-amide,
D-Ser$^1$-Lys$^{17,18}$-$\beta^{1-24}$-corticotropin-Pro$^{24}$-amide,
D-Ser$^1$-Nle$^4$-Lys$^{17,18}$-$\beta^{1-24}$-corticotropin-Pro$^{24}$-amide,
D-Ser$^1$-Lys$^{17,18}$-$\beta$-$1-24$-corticotropin,
D-Ser$^1$-Orn$^{17,18}$-$\beta^{1-24}$-corticotropin,
D-Ser$^1$-Gly$^3$-$\beta^{1-24}$-corticotropin,
Nle$^4$-Lys$^{17,18}$-Val$^{25}$-$\beta^{1-25}$-corticotropin-Val$^{25}$-amide,
D-Ser$^1$-Nle$^4$-Val$^{25}$-$\beta^{1-25}$-corticotropin-Val$^{25}$-amide,
$\beta^{1-25}$-corticotropin-Val$^{25}$-amide,
Nle$^4$-$\beta^{1-25}$-corticotropin-Asp$^{25}$-amide,
Nle$^4$-Val$^{25}$-$\beta^{1-25}$-corticotropin-Val$^{25}$-amide,
Nva$^4$-Val$^{25}$-$\beta^{1-25}$-corticotropin-Val$^{25}$-amide,
Nle$^4$-Lys$^{17,18}$-Val$^{25}$-$\beta^{1-25}$-corticotropin-Val$^{25}$-amide,
$\beta^{1-26}$-corticotropin, $\beta^{1-28}$-corticotropin,
$\beta^{1-30}$-corticotropin,
$\beta^{1-31}$-corticotropin,
$\beta^{1-39}$-corticotropin and D-Ser$^1$-$\beta^{1-39}$-corticotropin.

What is claimed is:

1. A complex of an adrenocorticotropically active peptide selected from the group consisting of (a) $\beta^{1-n}$-corticotropin, wherein n is an integer from 16 to 39, both inclusive, (b) $\beta^{2-n}$-corticotropin, wherein n is an integer from 16 to 39, both inclusive, (c) a peptide of (a) or (b) in which at least one of the amino acids in the 1-, 2-, 3-, 4-, 5-, 17-, 18-, and 25-positions is exchanged for another amino acid, the amino acid in position 1 being a member of the group consisting of L-serine, D-serine, glycine, L-alanine, D-alanine, L-proline, D-proline, L-threonine and D-threonine, the amino acid in position 2 being a member of the group consisting of L-tyrosine and L-phenylalanine, the amino acid in position 3 being a member of the group consisting of L-serine, glycine and L-alanine, the amino acid in position 4 being a member of the group consisting of L-methionine, L-norvaline, L-leucine, L-norleucine and L-α-aminobutyric acid, the amino acid in position 5 being a member of the group consisting of L-glutamic acid and L-glutamine, the amino acid in position 17 and the amino acid in position 18 being a member of the group consisting of L-arginine, L-ornithine and L-lysine, and the amino acid in position 25 being a mmeber of the group consisting of L-aspartic acid and L-valine and (d) a C-terminal N-unsubstituted amide of a peptide of (a), (b) or (c) with a polyphosphoric acid or an alkali metal salt of such acid and having the formula $R_{m+2}P_mO_{3m+1}$ wherein R is a member of the group consisting of hydrogen and an alkali metal and m is 7 to 10,000, the ratio by weight of peptide to polyphosphate being 1:1 to 1:20.

2. A complex as claimed in claim 1 of an adrenocorticotropically active peptide with an alkali metal polyphosphate.

3. A complex as claimed in claim 1 of an adrenocorticotropically active peptide with a polyphosphate of the formula $Na_{m+2}P_mO_{3m+1}$ in which $m=20$ to 500.

4. A complex as claimed in claim 1 of an adrenocorticotropically active peptide with a polyphosphate of the formula $Na_{m+2}P_mO_{3m+1}$ in which the average value of m is 7.

5. A complex as claimed in claim 1 of an adrenocorticotropically active peptide with a polyphosphate of the formula $Na_{m+2}P_mO_{3m+1}$ which the average value of m is 15 to 30.

6. A complex as claimed in claim 1, that contains as adrenocorticotropically active peptide β-corticotropin.

7. A complex as claimed in claim 1, that contains as adrenocorticotropically active peptide a peptide whose amino acid sequence is identical to that of the N-terminal 18 to 28 amino acids of β-corticotropin in which one or 8. A complex as claimed in claim 1, that contains as adrenocorticotropically active peptide a peptide whose amino acid sequence is identical to that of the N-terminal 18 to 28 amino acids of β-corticotropin in which one or more of the amino acids in positions 1 to 5, 17, 18 and 25 is exchanged for another amino acid.

9. A complex as claimed in claim 1, that contains as adrenocorticotropically active peptide a peptide whose amino acid sequence is identical to that of the N-terminal 18 to 25 amino acids of β-corticotropin.

10. A complex as claimed in claim 1, that contains as adrenocorticotropically active peptide a peptide whose amino acid sequence is identical to that of the N-terminal 18 to 25 amino acids of β-corticotropin in which one or more of the amino acids in positions 1 to 5, 17, 18 and 25 is exchanged for another amino acid.

11. A complex as claimed in claim 1, that contains as adrenocorticotropically active peptide $\beta^{1-24}$-corticotropin.

12. A complex as claimed in claim 1, that contains as adrenocorticotropically active peptide a peptide in which the N-terminal amino acid is a D-amino acid.

13. A complex as claimed in claim 1, that contains as adrenocorticotropically active peptide a peptide in which the N-terminal amino acid is D-serine.

14. A complex as claimed in claim 1, that contains as adrenocorticotropically active peptide D-Ser$^1$-$\beta^{1-24}$-corticotropin or its Pro$^{24}$-amide.

15. An aqueous suspension containing a complex as claimed in claim 1.

References Cited

UNITED STATES PATENTS

| 3,108,042 | 10/1963 | Murphy et al. | 424—179 |
|---|---|---|---|
| 3,192,114 | 6/1965 | Hogberg et al. | 424—183 |
| 3,228,927 | 1/1966 | Kappeler et al. | 260—112.5 |
| 3,243,345 | 3/1966 | De Jager | 424—179 |
| 3,352,844 | 11/1967 | Bolssonnas et al. | 260—112.5 |

OTHER REFERENCES

Netherlands application, 6510560, February 1966, Ciba (assignee), 260, 112.5, pp. 1–8, 37–43.

Bolssonnas et al. II, Experientia 22, 526 (1966).

Elpiner et al., Biokhimiya 30, 1090–1097 (1965).

LEWIS GOTTS, Primary Examiner

M. M. KASSENOFF, Assistant Examiner

U.S. Cl. X.R.

424—177, 179

CASE 6119/1-3

PO-1050
(5/69)

UNITED STATES PATENT OFFICE
CERTIFICATE OF CORRECTION

Patent No. 3,639,383　　　　　　　　　Dated February 1, 1972

Inventor(s) Leo Geller

It is certified that error appears in the above-identified patent and that said Letters Patent are hereby corrected as shown below:

Column 5, line 6, delete "in which one or"

Signed and sealed this 19th day of September 1972.

(SEAL)
Attest:

EDWARD M. FLETCHER, JR.　　　　　　　ROBERT GOTTSCHALK
Attesting Officer　　　　　　　　　　　Commissioner of Patents